United States Patent [19]
Locatelli

[11] Patent Number: 6,007,197
[45] Date of Patent: Dec. 28, 1999

[54] HOOK FOR REMOVABLY SECURING A MONOCULAR SCREEN TO AN EYEGLASS LENS

[76] Inventor: Daniel J. Locatelli, 5, impasse des Santolines, Carry-le-Rouet, France

[21] Appl. No.: 09/022,455

[22] Filed: Feb. 12, 1998

[30] Foreign Application Priority Data

Mar. 6, 1997 [FR] France ................................ 97 02890
Oct. 8, 1997 [FR] France ................................ 97 12786

[51] Int. Cl.⁶ ........................................................ G02C 9/00
[52] U.S. Cl. ............................................... 351/47; 351/57
[58] Field of Search ................................ 351/47, 57, 48, 351/58, 41, 44

[56] References Cited

U.S. PATENT DOCUMENTS

| | | | |
|---|---|---|---|
| 3,600,069 | 8/1971 | McNeil | 351/140 |
| 4,824,234 | 4/1989 | Sparks et al. | 351/47 |
| 5,017,001 | 5/1991 | Kooketsu | 351/86 |
| 5,123,724 | 6/1992 | Salk | 351/57 |
| 5,654,785 | 8/1997 | Shih et al. | 351/47 |

FOREIGN PATENT DOCUMENTS

| | | |
|---|---|---|
| 1087131 | 2/1955 | France . |
| 1138199 | 6/1957 | France . |
| 2538920 | 7/1984 | France . |
| 2681441 | 3/1993 | France . |
| 2682197 | 4/1993 | France . |
| 2718254 | 10/1995 | France . |
| 3734649 | 4/1989 | Germany . |
| 92169198 U | 4/1993 | Germany . |
| 9719384 | 5/1997 | WIPO . |

Primary Examiner—Hung Xuan Dang
Attorney, Agent, or Firm—Ladas & Parry

[57] ABSTRACT

The present hook is a deformable hook for removably securing a monocular screen to an eyeglass. The hook includes a first end portion for fixing to said screen, a second end portion for contacting with a peripheral surface of said eyeglass, and a central portion interconnecting the first and second end portions and for passing over an edge surface of the eyeglass. The first and second end portions include a pin portion extendable through an orifice in a periphery of the screen. The hook is a solid body, and the first end portion is preferably of a rectilinear shape extending along a longitudinal axis.

18 Claims, 6 Drawing Sheets

HOOK FOR REMOVABLY SECURING A MONOCULAR SCREEN TO AN EYEGLASS LENS

FIELD OF THE INVENTION

The present invention relates to optical accessories for eyeglasses, and to a method of manufacturing them.

The technical field of the invention is the field of optical accessories for eyeglasses.

The invention relates to optical devices for eyeglasses enabling the characteristics of the eyeglasses to be temporarily adapted to special conditions: to varying lighting conditions (e.g. for using eyeglasses in mountains, beside the sea, or indeed for driving a motor vehicle at night); or to special conditions of use of the eyeglasses (e.g. when working in front of a computer screen, or to protect the eyes and the eyeglasses from shocks or splashes, e.g. when performing welding or grinding work).

BACKGROUND OF THE INVENTION

Given that the manufacturers of frames do not provide a screen (or additional face) of shape adapted to each frame put on the market, and in addition do not propose a screen of optical characteristics adapted to each requirement, the user of eyeglasses is faced with a very limited range of options: since the additional faces available on the market are of shapes that are generally not adapted to the shape of the frame of particular eyeglasses, the additional faces are mounted on the eyeglasses as an approximate fit and that generally gives rise to poor fixing; in addition, additional faces are generally unsuitable for being fixed to eyeglasses for children; a wearer of eyeglasses is thus faced with a restricted range of options for screens both in terms of shape and in terms of color.

U.S. Pat. No. 5,017,001 describes a monocular screen for eyeglasses including three fasteners of synthetic resin each in the form of an arch and each provided with a central projection; a front portion of the fastener is inserted in a groove provided at the periphery of the screen, and a rear portion of the fastener can clip onto the frame of the eyeglasses that receive the screen; the fastener is fixed to the glass of the screen either by adhesive applied to the inside face of the front portion of the fastener, or by making holes in the front portion of the fastener, in the central projection, and in the periphery of the lens; under such circumstances, the fastener is secured by means of a wire-like piece of material which is inserted through the orifices and which is held in place by adhesive or by being a force-fit, like a cotter or other pin.

The screen is assembled on the pair of eyeglasses by a transverse movement and by a pivoting movement; to this end, the three fasteners are disposed in a special configuration.

That monocular screen suffers from drawbacks: making grooves in the periphery of the screen lens requires special tooling such as a grinder, and also requires a high degree of accuracy in machining to obtain a groove of shape that matches that of the fastener; in addition, making grooves that open out into the periphery of a lens runs the risk of damaging the lens, in particular the risk of breaking it, specifically when the profile of the groove is angular in shape.

The monocular screen described in that document is difficult to fix to the frame of eyeglasses in stable manner because of the fasteners having special positions that are made necessary by the special movement for securing the monocular screen to the pair of eyeglasses, in particular because of the presence of a top fastener in a substantially central position and because of the presence of two bottom fasteners on the sides; that disposition also makes it necessary to identify accurately and measure accurately the height of the eyeglasses so as to match the positions of the fasteners as a function of the height of the eyeglasses, which requires a special measuring tool to be used; the special configuration of fasteners described in that document leads to the need to provide a fastener of matching shape for each thickness of screen lens in order to clamp the screen lens between the front portion of the fastener and its central projection; similarly, the screen described in that document requires a fastener of shape that is adapted to each thickness of frame or lens in the pair of eyeglasses that is to receive the screen, so as to clip onto the frame of the eyeglasses by means of the cavity provided between the lateral rear portion and the projection of the fastener.

In the embodiment where said fastener is secured to the lens of the monocular screen by a pin-forming wire-like piece, i.e. when said fastener is in two portions, this also requires precise orifices to be machined to enable the orifices to be brought into alignment and to allow the pin-forming wire-like piece to be put into place, and this also gives rise to special difficulties associated with handling a pin of very small size.

When the pin is glued, an additional difficultly lies in selecting an adhesive that is compatible with the three possibly different materials of the fastener, of the screen lens, and of the pin itself; under such circumstances, an additional problem results from the small size of the surfaces to be stuck together, which surfaces are also very difficult of access; an additional difficulty and drawback also results from the embodiment in which the pin-forming wire-like piece is a force-fit in orifices provided in the fastener and in the lens of the monocular screen, given the very small dimensions of such orifices and of the pin; in addition, that document gives no details about the materials and the tools required to obtain such a force-fit.

U.S. Pat. No. 5,123,724 describes a method of manufacturing a binocular screen for eyeglasses.

OBJECTS AND SUMMARY OF THE INVENTION

The present invention seeks to provide an improved monocular additional face device (or removable monocular screen) for eyeglasses, and to provide a method of manufacturing it.

An object of the invention is to provide an improved device for fixing a monocular screen on eyeglasses.

In a first aspect, the invention consists in providing an improved removable monocular screen for eyeglasses; the screen (or additional face) is preferably essential constituted by a made-to-measure lens of outline that is identical or similar to the outline of the lens of the pair of eyeglasses against which (or close to which) the additional screen (or lens) can be positioned and held in position by deformable means for removable fixing which are integrated in the screen and which co-operate with the lens and/or the frame of the eyeglasses.

The deformable means for removably fixing the monocular screen on eyeglasses are mechanical fixing means essential constituted by at least two and at most four hooks (or clasps or tabs or clips), preferably three hooks, which are deformable (at least in part and preferably completely) to enable them to be engaged around (and conversely disengaged from) the lens and/or a portion of the frame surrounding the lens of eyeglasses.

According to a preferred characteristic of the invention, the two end portions of the hook and the central portion interconnecting them are elongate or wire-like: they are of a length such that the ratio of the length to the largest dimension of their cross-section is not less than three, e.g. being close to 5 to 15 or 20; this elongate shape contributes to the capacity of the hook to deform, makes the hook easier to handle when securing it to the screen, and facilitates fitting the hook to the screen and to the pair of eyeglasses by providing an end portion that can be cut off and which is cut off to match the screen to the shape of the eyeglasses, and to fit the hook to the lens of the screen.

The hook is preferably constituted by a single molded piece of plastics material of appropriate hardness, in particular in the vicinity of 90 to 95 on the Shore A scale, and comprising:

- a first end suitable for being fixed to said screen;
- a second end suitable for being placed in contact with the peripheral zone of a lens or a portion of the frame, which end is elongate and angled; and
- an angled central portion suitable for placing astride the edge surface of an eyeglass lens or an eyebrow portion of the eyeglass frame.

Thus, the angled central portion and the angled end portion form an S-shape because of the presence of two successive curves (i.e. curves which are adjacent or juxtaposed) of opposite curvature; these angles preferably extend over more than 90°, preferably over 120° to 210° for the bend connecting the central portion to the end, and preferably 150° to 270° for the opposite bend incorporated in said second end.

In a first preferred variant of the invention, each hook is fixed to the lens of the screen by engaging an end of the hook in an orifice pierced in (through) a peripheral portion of the lens; mechanical bonding is obtained by engaging a portion of one end of the hook, which portion is extended at each of its ends by respective stop parts projecting from said portion, outside the lens, so as to form a pair of abutments.

Thus, in one aspect, the invention consists in proposing a hook for (temporarily and/or removably) securing a monocular screen to eyeglasses in order to position and hold the screen in register with a lens of the eyeglasses, substantially against the front or rear face of the lens, which hook comprises:

- a first portion (or substantially rectilinear first end of non-constant section) suitable for being rigidly fixed to said screen in a peripheral zone thereof which includes:
  - a pin portion suitable for extending through an orifice provided at the periphery of the screen; and
  - at least one first abutment and at least one second abutment which are disposed at opposite ends of said pin portion, with at least one of the abutments being deformable or retractable (so as to be suitable for passing through said orifice);
- a deformable second portion (or central portion) suitable for placing astride the edge surface of a lens of the eyeglasses (particularly for an interrupted frame) and/or for placing astride an eyebrow portion of an eyeglass frame, which second portion comprises a rectilinear portion of constant section terminated at each of its ends by respective link bends linking it with the ends of the hook; and
- a third portion (or second end) that is angled and suitable for being placed in contact with the peripheral zone of a lens, or with a portion of the frame, which third portion is of constant section and extends the bend of said central portion with opposite curvature to give an S-shape.

The hook is preferably made as a single piece and is elongate, being generally U- or L- or R- or S-shaped; it can also have a "fancy" shape (e.g. representing a hand holding an object, specifically the screen, . . . ); although it can be made of metal (at least in part), the hook is preferably molded of a cuttable material, such as a plastics material, of hardness that is much less than that of the hardness of the material constituting the lens; this makes it easy to deform the abutment(s) provided in the vicinity of the pin-engagement portion at the first end of the hook; the hook can be made of injected polyurethane; this makes it cheap to manufacture, and also facilitates matching it to various shapes and sizes of eyeglass frame; such fitting is obtained, in particular, by cutting off a portion of the second end thereof.

The hook is preferably colored, e.g. being black, golden, brown (tortoise shell), in color, or it can be translucent.

In a second preferred embodiment, the hook is stuck to the lens of the screen via its first end to fix the hook mechanically in rigid manner, either to the edge surface of the screen lens, or else in a peripheral portion of the front face (or indeed the back face) of the screen lens; under such circumstances, the first end is preferably substantially rectilinear and extends substantially perpendicularly to the central portion; in this second variant, the cross-sections of the various portions of the hook may be substantially constant, whereas in the first variant, the cross-sections of the various portions of the first end differ from one portion to another.

In a third variant embodiment, the deformable hook is fixed to the screen by a rivet or by a screw.

According to other preferred embodiments of the hook:

- said first and second ends of the hook, and also the central portion interconnecting them, are of a cross-section whose area lies in the range 0.5 mm$^2$ to 5 mm$^2$, preferably being about 0.7 mm$^2$ to 2.5 mm$^2$, in particular to make one or both ends of the hook easy to cut off and to facilitate fitting the hook to eyeglass lenses and frames of various types, shapes, and thickness; and
- said hook or hook blank is essentially constituted by a solid elongate and angled body of non-constant cross-section, preferably of cross-section that is practically rectangular.

The fasteners or hooks of the invention have numerous advantages:

Because the hooks are molded as single pieces, they can be made at very low cost, and handling them to secure them to the screen and also to mount the screen on the pair of eyeglasses is facilitated, in particular when elongate ends of cuttable material are used, with said ends, prior to being cut off, constituting means that make it easier for the optician to handle the hook; this handling is made particularly easy when the rear end of the hook of the invention is S-shaped, thus also facilitating engaging and disengaging the screen relative to the frame; this manipulation is further facilitated by the elongate shape of the hook and by the choice of cross-section whose value varies over a given range, and by using a material that is highly deformable because of an appropriate choice of hardness within a determined range of values.

In a first variant embodiment where the hook has a pin portion that engages in an orifice pierced through the lens near its periphery and not forming a notch opening out into said periphery, which pin portion has a tapering end, it is very easy by hand and without using a tool to insert the tapering end in the orifice provided in the monocular screen lens, and then to exert traction on said tapering end by means of flat-tipped tweezers to cause said end to engage in the lens and obtain a rigid connection in a manner that is very simple; by means of a portion of the hook which lies over the periphery of the lens of the monocular screen and which extends substantially in line with the central portion of the hook, it is also possible to ensure that the hook does not rotate relative to the screen when it is engaged in the orifice pierced through the screen; the relative positioning of the three hooks in a preferred embodiment, comprising a single bottom hook plus two top hooks suitable for extending in the vicinity of the bridge and of the endpiece of the pair of eyeglasses, also makes it possible to achieve very stable removable attachment of the monocular screen on the eyeglass frame.

The invention makes it possible to provide additional faces or screens of shape and size that are adapted to a given type of frame; the various advantages provided by the invention include the following:

the monocular screen constituted by a lens and its fastening hooks is light in weight;

the screen is of low cost, and can be made easily and quickly as a function of the needs of each wearer of eyeglasses;

a screen of appropriate shape and color is pleasing in appearance;

it is possible to make screens from any type of lens blank, in particular lenses of thickness that may lie in the range 0.5 mm to 5 mm or even 10 mm; particularly when making additional screens for filtering and/or correction purposes;

it is advantageous to be able to make a correcting monocular screen for patients who have recently had an operation performed on one eye only, in particular a cataract operation (thereby providing temporary additional correction without changing the lens in use prior to the operation);

the ease with which the screen can be attached to (and conversely removed from) the eyeglasses by the user, without needing any tools; and the option of making a monocular screen that can be fixed either in front of the lens or behind it: this particular option is particularly advantageous for people who are long-sighted, and wearing eyeglasses in which the correcting lenses are provided with a rear face of curvature that is smaller than that of the front face; it can then be advantageous to provide for the screen to be fixed against the rear face of the correcting lens.

Screens of the invention are very easy for an optician to make; this becomes even easier when there is no need for the hooks to be stuck to the screen; in addition, it is particularly easy to pierce engagement orifices through the periphery of the lens of the screen when the lens is made of polycarbonate.

The invention also provides a case (flexible or rigid) which includes at least one compartment and preferably at least two identical compartments, e.g. four or six identical compartments, each compartment being specially provided to receive a monocular screen of the invention; the case may also include a housing for the pair of eyeglasses for which the screens are intended.

BRIEF DESCRIPTION OF THE DRAWINGS

The numerous advantages provided by the invention will be better understood from the following description which refers to the accompanying drawings, which show preferred embodiments of the invention without the invention being limited thereto in any way.

In the drawings, elements that are identical or similar are given the same references from one figure to another, unless specifically stated to the contrary.

FIGS. 6 and 7 are likewise side views of two other embodiments of a monocular screen fitted with stuck-on hooks, while

FIG. 8 and enlarged detail similar to FIG. 5 showing how a monocular screen of FIG. 7 is mounted on the front of a closed frame fitted with a lens; FIG. 8 is seen on VII—VII of FIG. 16.

FIGS. 1 to 9 and 16 relate in particular to using hooks that are stuck on in the second embodiment of the invention; FIGS. 11 to 15, 17, and 18 relate to hooks engaged in orifices pierced through the screen.

MORE DETAILED DESCRIPTION

Figure 3:
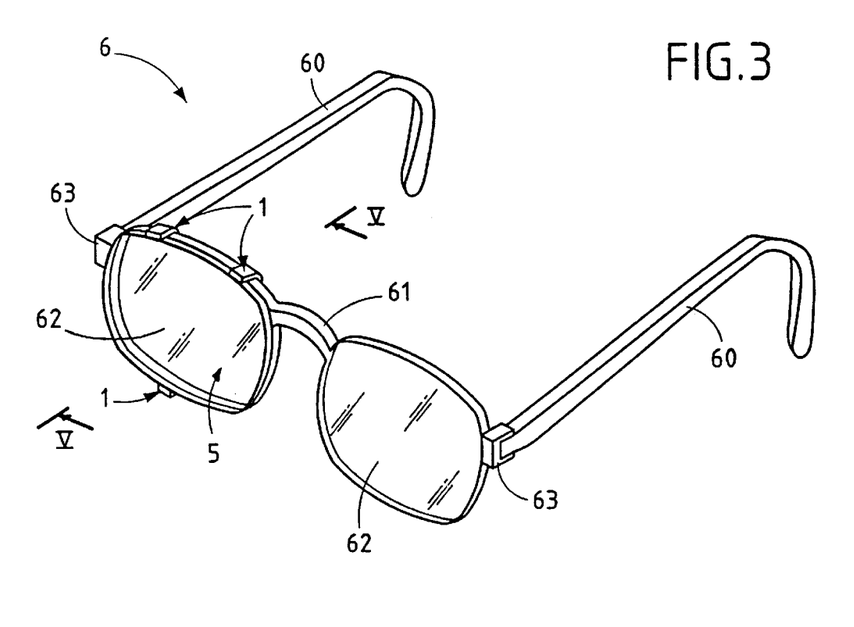
FIG. 3 is a diagrammatic perspective view of a pair of eyeglasses fitted with a monocular screen of the invention.
Figure 4:
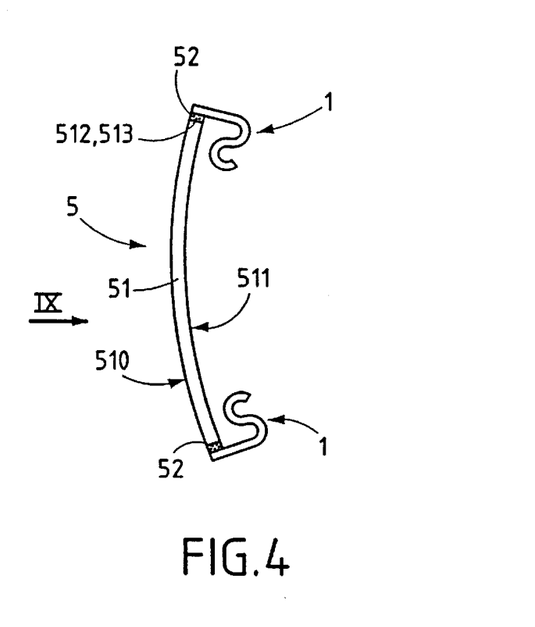
FIG. 4 is a side view of the monocular screen provided with a deformable hook stuck onto the edge surface of the lens of the screen.
Figure 16:
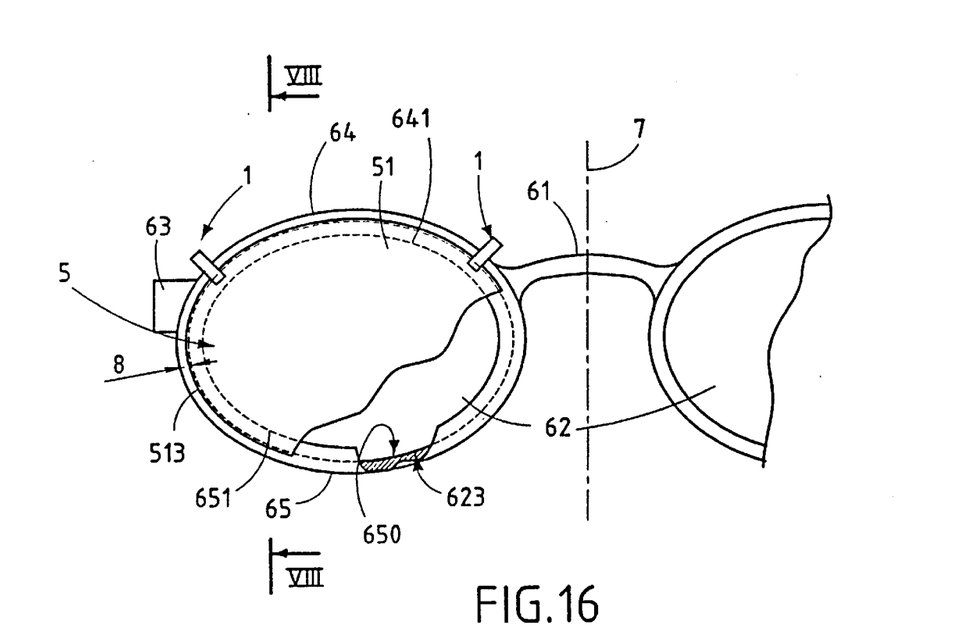
FIG. 16 is a fragmentary front view of a pair of eyeglasses having a closed frame with the right lens thereof fitted with a monocular screen of the invention.

With reference to FIGS. 3 and 16 in particular the invention applies to eyeglasses 6 comprising a frame, together with two temples 60, two lenses 62 (generally symmetrical about an axis 7 of symmetry of the pair of eyeglasses), and a bridge 61 interconnecting the left and right portions of the pair of eyeglasses; an endpiece 63 connects each temple 60 of the frame to the lens 62 of the pair of eyeglasses and/or to the front portion of the frame.

Figures 7, 8, 8A:
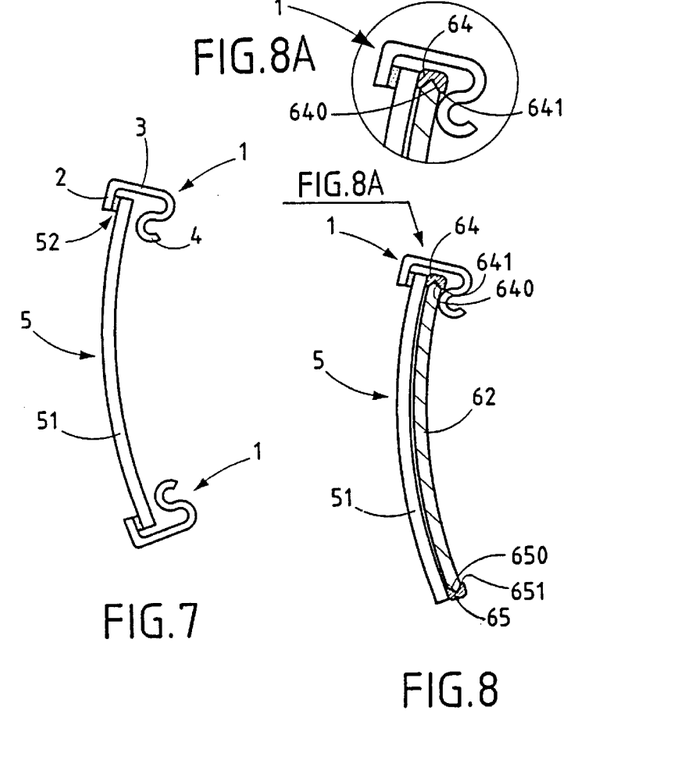
Figure 9:
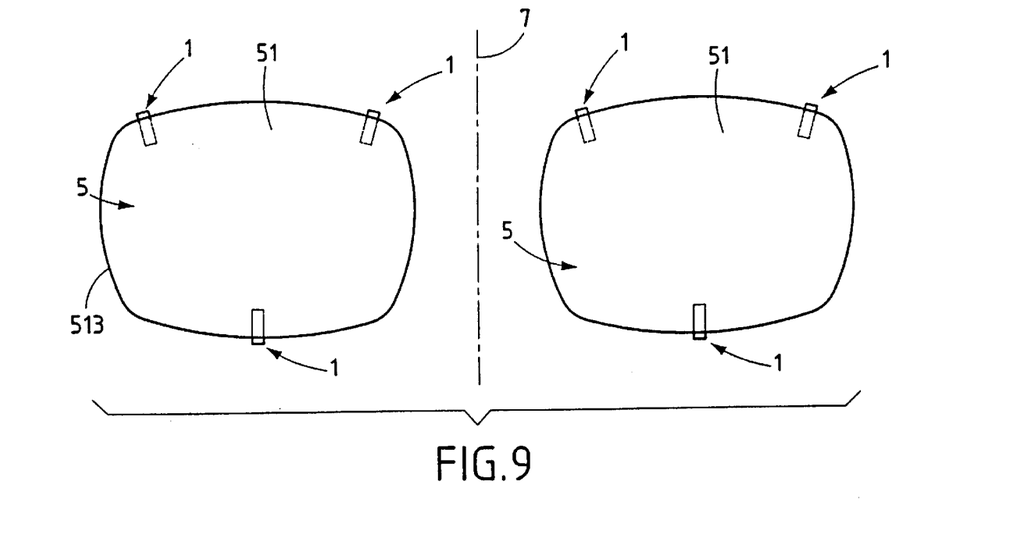
FIG. 9 is a front view of a pair of monocular screens of the invention, which are generally symmetrical.
Figure 13:
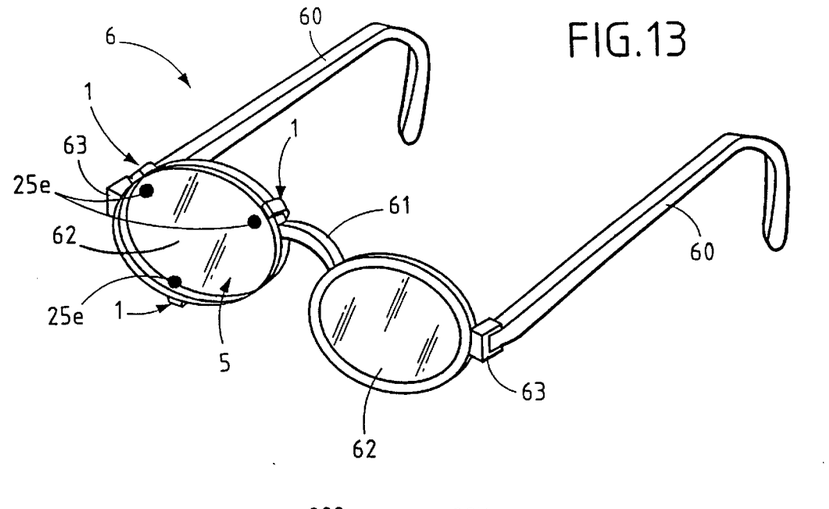
FIG. 13 is a diagrammatic perspective view of a pair of eyeglasses fitted with a monocular screen having mechanically engaged hooks.
Figure 14:
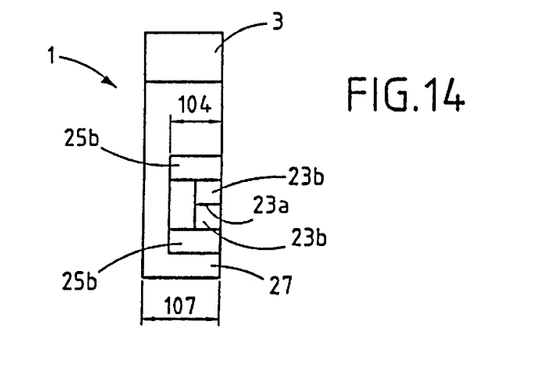
FIG. 14 is a front view of the FIG. 11 hook and is a view on XIV of FIG. 11.

In the example shown in FIG. 3, the frame is interrupted, and each lens 62 provides the mechanical connection between the bridge 61 and the corresponding temple 60 via the endpiece 63; with the frame shown in FIGS. 13 and 16, each of the left and right portions of the front face of the frame has a generally arcuate eyebrow portion 64 extending between the endpiece 63 and the bridge 61 over the top of the lens 62 and encompassing the top portion thereof, which eyebrow portion 64 is extended round the bottom portion of the lens 62 by a rim 65 surrounding the bottom periphery of the lens 62, as can also be seen in FIG. 8.

Each monocular screen 5 of the invention is constituted by a lens 51 whose concave shape is generally similar to (or indeed identical to) the convex shape of the lens 62 of the pair of eyeglasses for which the screen 5 is intended, which screen also includes at least two and preferably three hooks 1 distributed around its circumference, with the hooks serving to hold the screen in register with the corresponding lens 62 of the pair of eyeglasses, at the front thereof as shown in FIGS. 3, 5, 8, 13, 16, and 17 (even though the invention can also be used for mounting the screen behind the lens 62 of a pair of eyeglasses).

In the embodiment shown in FIGS. 4, 5, 6, and 9, each hook 1 is rigidly held in place by adhesive using a drop 52 of an adhesive of an appropriate formulation connecting it to the edge surface 512 of the lens 51 of the screen 5; alternatively, as shown in FIGS. 7 and 8 in particular, the hook 1 may be rigidly fixed to the lens 51 by means of a drop 52 of adhesive on a peripheral portion of the front face 510 of the lens 51 (which face is generally convex).

In the assembly position, the rear face 511 of the lens 51 of the screen 5 extends in register with the front face 620 of the lens 62 of the pair of eyeglasses, either against it or at a short distance therefrom, depending on whether or not the lens frame includes arcuate portions, and depending on the thickness of the arcuate portion 64 and of the rim 65 (FIG. 8) and/or of the portion 27 of the end 2 which acts as a spacer (FIG. 17) between lenses 51 and 62.

As shown in FIGS. 3, 13, and 16 in particular, the outline 513 of the outer peripheral edge and/or of the edge surface 512 of the lens 51 of the screen 5 follows an outline that is identical or similar to the outline 623 of the edge or edge surface 622 of the lens 62 of the eyeglasses.

Figure 17:
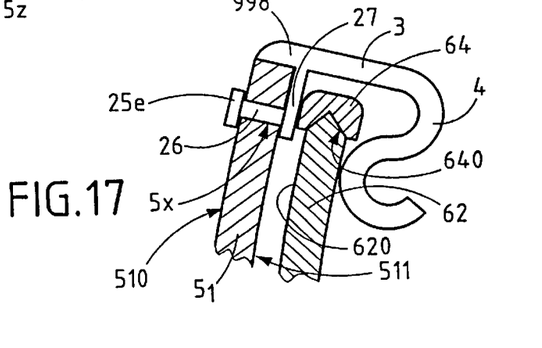
FIG. 17 is a fragmentary diagrammatic cross-section on a larger scale showing how a monocular screen is mounted on the front of a closed frame.

In the embodiment shown in FIGS. 8, 16, and 17, the outline 513 of the lens 51 of the screen 5 projects a constant short distance 8 around the entire periphery of the lens 51 relative to the outline 623 of the lens 62, which outline 623 corresponds to the outline of the edge or edge surface of the lens 62 which, in the embodiment shown in FIGS. 8 and 16, is chamfered and received in a groove (or bezel) 640, 650 respectively provided in the arcuate portion 64 of the frame and in the rim portion 65 extending it to surround the lens 62 of the pair of eyeglasses.

In an alternative (not shown), the outline 513 of the screen 551 may match the inner outline 641, 651 of the frame (the inside of its arcuate portion 64 and its lower rim 65) so as to come substantially into contact with the lens 62 of the eyeglass, and, where appropriate, be received in the thickness of the frame, i.e. so that it does not stand proud of the front face of the frame.

Figure 1:
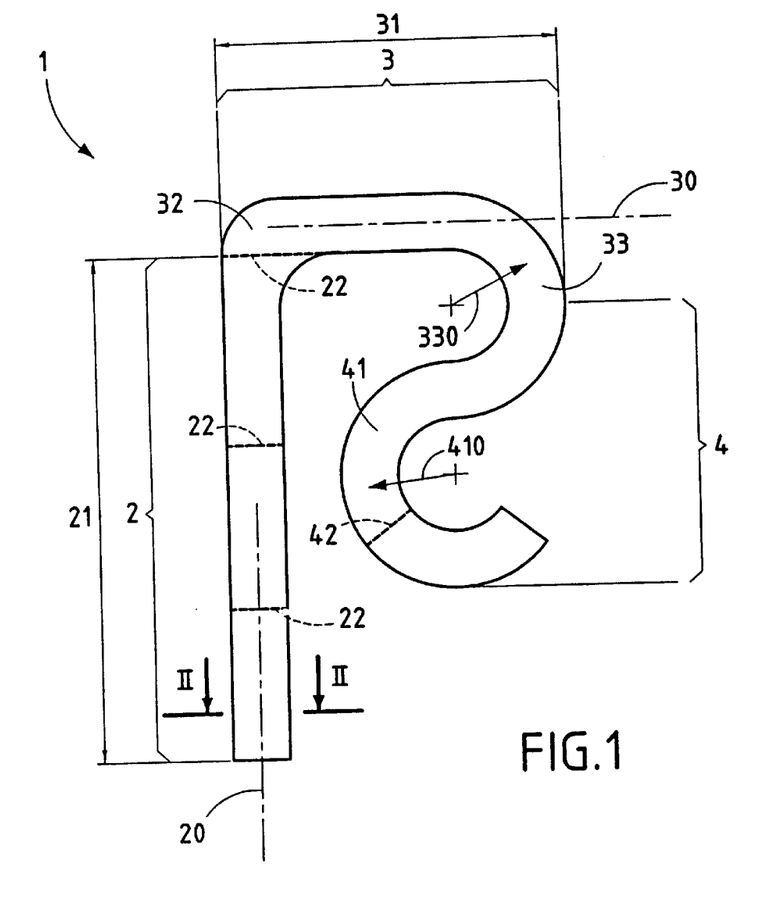
FIG. 1 is a side view of a preferred embodiment of a plastics material hook used in making a monocular screen of the invention.
Figure 2:
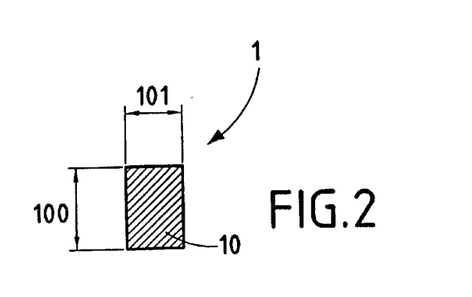
FIG. 2 is a cross-section through the body of the FIG. 1 hook in section on line II—II of FIG. 1.

With reference to FIGS. 1 and 2 in particular, said hook comprises a first end portion 2 that is substantially rectilinear on an axis 20 extending over a length 21 that preferably lies in the range 5 mm to 10 mm; the hook 1 has a first bend or curve 32 situated at the end of the first portion 2 and forming the connection between the first portion 2 and a second portion 3 of the hook which is substantially rectilinear on an axis 30 and of length 31, e.g. in the range 5 mm to 10 mm; this second or "central" portion 3 of the hook is terminated on the right-hand side of FIG. 1 by a bend or curve 33 having a radius of curvature 330 that preferably lies in the range 1 mm to 2 mm.

The bend 33 is extended by a third portion 4 forming a second end of the hook 1 and essentially constituted by a bend or curve 41 having a radius of curvature 410 which is preferably equal or similar to the radius of curvature 330 of the bend 33, the bends 33 and 41 forming an S-shape since these two successive bends curve in opposite directions (FIGS. 1, 11, 15, 18).

Matching the hook 1 to the particular shape of a given frame and/or eyeglass lens can be performed by cutting along one of the dashed lines referenced 22 for the first end portion referenced 2, and referenced 42 for the second end portion referenced 4.

Figure 5:
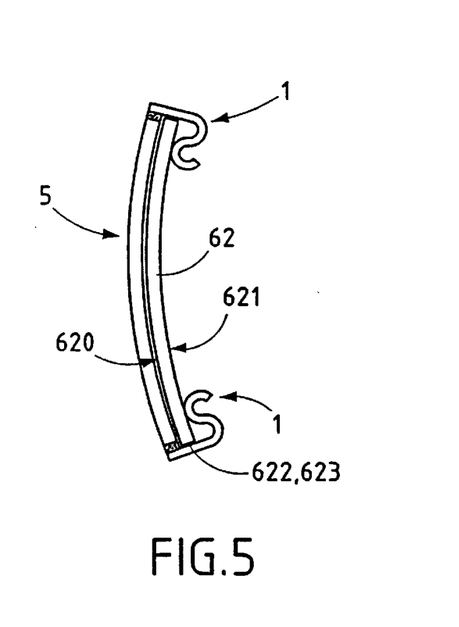
FIG. 5 is a view on V—V of FIG. 3 in diagrammatic cross-section showing a monocular screen of FIG. 4 mounted on the front face of the lens in a pair of eyeglasses.
Figure 6:
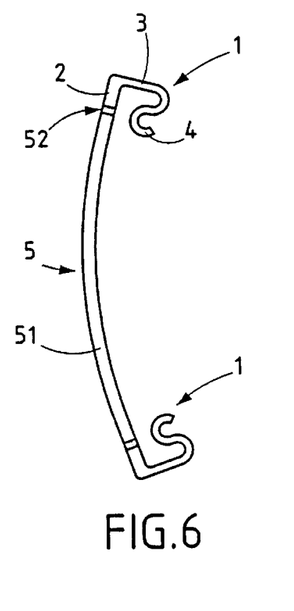

As shown particularly in FIGS. 5 and 8, the first end portion 2 of the hook 1 serves as an interface for rigidly fixing the hook 1 to the lens 51 of the screen 5 by adhesive, while the second end portion 4 bears against a portion of the frame and/or the rear face 621 of the lens 62 of the pair of eyeglasses.

The end portions 2 and 4 of the hook are united by a deformable central portion 3 which contribute to the deformation capacity of the hook 1, enabling its ends to be moved apart when the hook 1 is being engaged on or removed from the pair of eyeglasses.

In the position-where the screen 5 is engaged on the pair of eyeglasses, the hook 1 is fitted over (like a clip or a clamp) a peripheral portion of the lens 62 of the eyeglasses, as shown in FIG. 5, or else it is fitted over a zone of the arcuate portion 64 and where appropriate of the bottom rim 65 of the frame of the eyeglasses; as shown in FIGS. 3 and 16 in particular, two hooks 1 are provided at the top of the screen 5 so as to fitted over the arcuate portion 64 and/or the top portion of the edge surface of the lens 62, respectively in the immediate vicinity of the endpiece 63 and of the bridge 61, thereby facilitating proper positioning of the screen 5 relative to each of the lenses 62 of the eyeglasses so as to occupy a position that is substantially centered relative thereto.

Figure 10:
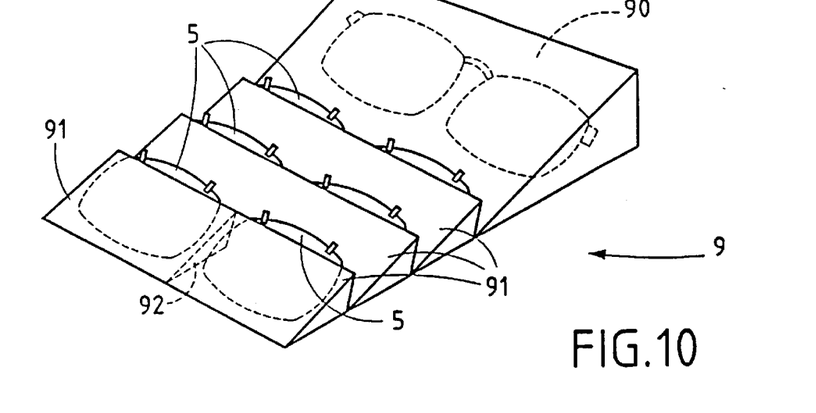
FIG. 10 is a diagrammatic perspective view of an eyeglass case of the invention.

With reference to FIG. 10, a case 9 has a compartment 90 suitable for receiving a pair of eyeglasses whose temples have been folded; the case 9 also includes a plurality of additional housings or compartments 91 of identical shape and/or size, each suitable for receiving a monocular screen 5 adapted to the pair of eyeglasses that is to be received in the compartment 90; the case 9 has three rows each of two identical juxtaposed compartments 91, the compartments in each row being separated by a partition 92.

With reference to FIGS. 11, 15, 17, and 18 in particular, the hook 1 has a first end portion 2 that is substantially rectilinear on an axis 20 and that extends over a length 21 lying in the range 5 mm to 15 mm, and is in particular in the vicinity of 10 mm; the hook 1 includes a bend 32 situated at the end of a tab 27 forming the link between the first portion 2 and the second portion 3 of the hook, which link is substantially rectilinear on axis 30 and of length 31 that is in the range 5 mm to 10 mm, for example; this second or central portion 3 of the hook is terminated (on the right in the figures) by a bend 33 having a radius of curvature 330 that preferably lies-in the range 1 mm to 2 mm.

Figure 15:
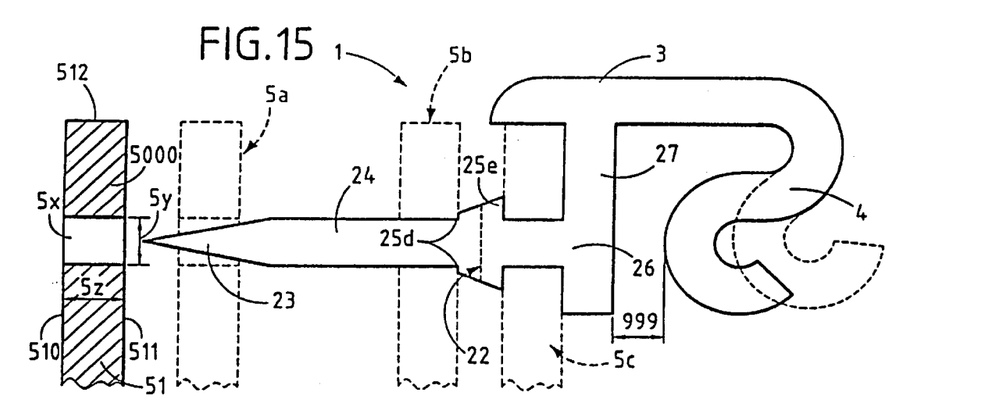
FIG. 15 is a side view of the successive stages (corresponding to the positions marked 5a to 5c of the lens) in an operation of securing one end of a hook identical to that of FIGS. 11 and 14 so that it is mechanically engaged in an orifice pierced in a lens 51, thereby making up a screen.
Figure 18:
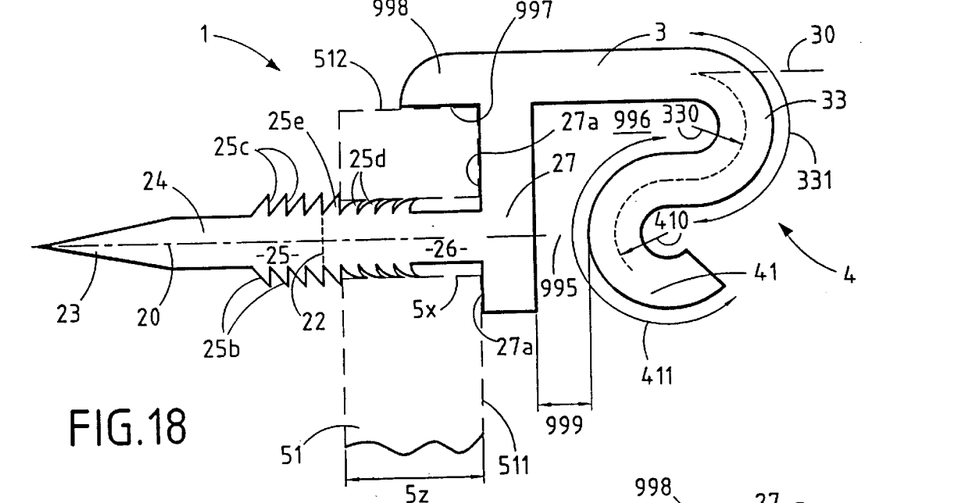
FIG. 18 is a view similar to FIG. 15 showing a variant embodiment of the hook.

As shown particularly in FIGS. 15, 17, and 18, the first end portion 2 of the hook 1 serves as an interface for rigidly fixing the hook 1 to the lens 51 of the screen 5 by engagement of a pin portion 26 of the portion 2 in an orifice 5x provided in the lens 51.

Figure 12:
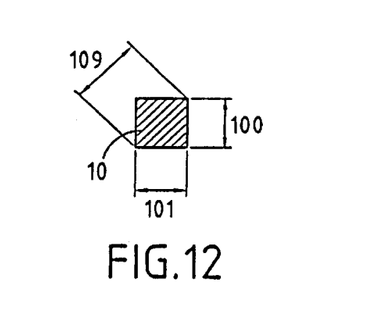
FIG. 12 is a cross-section through the body of the FIG. 11 hook and is a view on XII—XII of FIG. 11.

As shown in FIGS. 2 and 12, the body 10 of the hook may be provided with a solid section that is substantially rectangular or square in shape; in particular, the cross-section of the portion 24 of the end 2 has a width 101 of about 1 mm, and a length (or height) 100 also of about 1 mm; the diagonal 109 can be longer than the diameter 5y (about 1.2 mm) of the orifice 5x provided in the lens.

Figure 11:
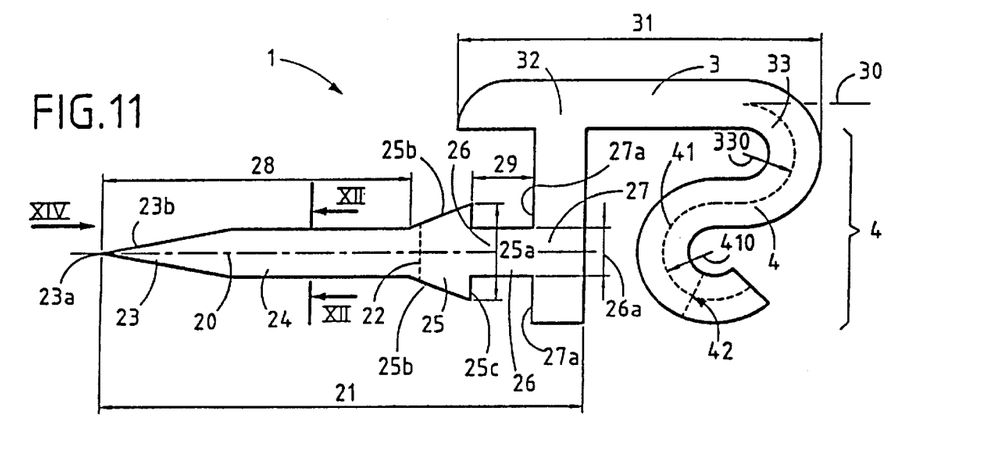
FIG. 11 is a side view of a preferred embodiment of a plastics material hook that is secured by mutual interfitting engagement and that is for use in making a monocular screen of the invention.

With reference to FIGS. 11 and 15 more particularly, the end 2 comprises in succession along the axis 20:

an end portion 23 that is conical, or frustoconical, or tapering, having faces 23b that terminate in a point 23a;

an intermediate portion 24 that is substantially cylindrical and that extends along the axis 20 substantially in line with said pin portion 26 suitable for extending from the orifice 5x, and having substantially the same cross-section as said portion 26;

a stop portion 25 situated between said portion 26 and said intermediate portion 24, on the axis 20 of said portions 24 and 26 and having two sloping faces 25b projecting from the portions 24 and 26 and extended by a connection face 25c constituting a first deformable or retractable abutment; the two ends of the projections 25b and 25c are spaced apart by a distance 25a that is greater than the diameter 5y of the orifice and greater than the largest dimension 26a, 109 of the pin portion 26; and a link portion 27 providing a link between said pin portion 26 and said second portion 3, and itself having two stops or faces 27a forming second abutments.

The tapering portion 23 can be inserted without effort through the orifice 5x because it is smaller in transverse dimensions than the diameter of the orifice; the portions 24 and 26 can be made to penetrate into the orifice 5x because said portions 24 and 26 contract radially when said portions are elongated by pulling on the tapering end portion 23 of the end 2.

The length 29 of the portion 26 may be about 1 mm to 1.4 mm, and the length 21 of the first portion 2 is approximately 10 mm to 15 mm; the total length 28 (e.g. about 6 mm) of the portions 23 and 24 is greater than the thickness 5z of the lens 51 so as to make it easier to take hold of the portion 23 or 24 (after it has passed through the orifice 5z) in the jaws of a pair of tweezers so as to exert traction on said point and cause the portion 25 including the projecting stop portions 25b and 25c to pass through the orifice; this causes the lens to go from the position referenced 5b (FIG. 15), compressing the projecting stop portions on the portion 25 (reference 25d) and stretching it longitudinally until the lens 51 comes into abutment against the stop portions 27a, which corresponds to the lens occupying the position referenced 5c in FIG. 15; in this engagement position with the pin portion 26 passing through the orifice 5x, the deformable stop portions and faces 25b and 25c have moved out from the orifice 5x; the faces 25c press against the front face 510 of the lens 51 and form abutments preventing the hook from being extracted from the orifice 5x; it is then possible to cut through the portion 25 along dashed line 22 so as to leave only a portion 25e that projects a little way from the front face of the lens 51.

In the embodiment shown in FIGS. 11 and 15, the length 29, at rest, of the pin portion 26 of the hook in the orifice 5x of the lens may be shorter than the thickness 5z (which is about *1.5* mm to *1.8* mm) of the lens 51, i.e. it may be shorter than the length or depth of the orifice 5x, so that once in the engaged position (reference 5c, FIG. 15), the pin portion 26 of the hook remains prestressed in traction.

In the embodiment shown in FIG. 18, the stop portion 25 has a plurality of identical juxtaposed projections 25b, 25c that are regularly distributed along the axis 20; this configuration is particularly suitable for lenses 51 of a screen of large thickness 5z, e.g. of the order of 2 mm to 10 mm; with the lens 51 in the position shown in FIG. 18, i.e. having its rear face 511 bearing against the abutment 27a, three compressed projections 25d are inside the orifice 5x provided through the lens 51; after the portion 25 has been cut off along dashed line 22, there remains one projection 25e outside the lens 51 serving to retain the hook engaged in the orifice; a portion 998 in line with the axis 30 of the central portion 3 projects forwards from the stop forming the abutment face 27a; this portion 998 has a face 997 that is substantially perpendicular to the face 27a; the face 997 extends in register with and substantially in contact with a portion of the edge surface 512 of the lens 51; as a result, the face 997 and the portion 998 contribute to preventing the hook from rotating about the axis 20 in the orifice 5x in the lens 51, thereby contributing to the stability of the assembly provided by the hook being engaged in the orifice, in addition to the friction forces that arise by contact between the portions 26, 25d inside the orifice 5x; this friction is enhanced by the angular shape (e.g. square) of the section of the pin portion 26 co-operating with the circular shape of the orifice 5x.

The two bends or curves 33 and 41 extend around respective bends 331 and 411 that are respectively in the vicinity of 180° and 210°; these two bends cause the portions 3 and 27 to form a loop 996 that is generally R-shaped, being provided with an opening 995 of width 999 that can vary between a rest value in the vicinity of 1 mm to 2 mm and a value that is two or three times as great, at least, by substantially elastic deformation of the portions 3, 33, and 41 in particular (illustrated in FIG. 15 by dashed lines), thereby enabling the frame or the edge surface of the eyeglass lens to be engaged in and disengaged from the loop 996 via the opening 995.

The lens (monocular lens) of the screen can be provided with an outline that is identical (in shape and size) to the outline of the lens of the eyeglasses against which it is to be mounted, particularly when the eyeglasses have a frame that is pierced or interrupted, i.e. when the frame does not include the eyebrow portions that would otherwise connect the bridge to the temples.

Alternatively, the lens of the screen may be given an outline similar to the outline of the lens of the eyeglasses, particularly when the eyeglasses have a frame that surrounds each of the two lenses of the eyeglasses, e.g. a frame made of plastics material; under such circumstances, the shape of the outline of the screen is identical to the shape of the outline of the eyeglass lens, but the size of the screen may be different from the size of the eyeglass lens: the outline of the screen may be derived from the outline of the corresponding lens of the eyeglasses (left or right) by adding a margin of substantially constant width, of the order of 0.5 mm to 2 mm, and preferably of the order of 1 mm to 2 mm; as a result, when the lens and the screen are placed next to each other, the outline of the lens projects beyond the outline of the screen by a substantially constant amount equal to the width of said margin.

In either case, the shape is identical insofar as a circular screen is cut to fit a circular lens, for example; when a lens has an outline that is in the form of a curvilinear quadrangle (or in the form of a rectangle with rounded corners), the corresponding screen is advantageously likewise in the form of a curvilinear quadrilateral (or in the form of a rectangle with rounded corners).

As described below, it is preferable to tailor-make the screen (left and right) as a function of the corresponding lens (respectively left and right) after measuring the outline of the lens of the eyeglasses (directly or indirectly): measurement can be performed by a feeler (sensor) which is preferably connected to electronic data processing means (a computer); the outline of the lens of the eyeglasses can be measured directly using the lens itself, or it can be measured indirectly on the frame, or indeed on a template; starting from the measured outline as recorded in an electronic measurement, data relating to the extra width of the screen relative to the lens can be input by the optician, thereby enabling the electronic data processor means to determine the exact shape desired for the screen; the computer can then control operation of a cutting tool (e.g. a grinder) for cutting the screen exactly to the desired shape and size; alternatively, the screen is ground to the shape of a template corresponding to the desired shape while using a conventional grinder.

In an aspect of the invention, an additional screen (add-on) is made for each of the lenses (left and right) of a pair of eyeglasses by means of a method comprising the following successive steps:

a) the outline of one of the lenses of a pair of eyeglasses under consideration is measured (the outline of the second lens of the pair of eyeglasses generally being deduced therefrom by symmetry) or from the frame (or indeed from a template corresponding to a particular frame);

b) a monocular screen is cut to shape (ground) from a blank of a material having appropriate optical and/or filter characteristics, to have an outline that is identical or similar to that of the lens, as explained above;

c) the screen is placed temporarily against the frame and the peripheral zones of the screen that correspond to optimum zones for fixing the hooks are identified, which optimum zones generally correspond to zones of the screen which, in the assembled-together position, are situated substantially in register with the endpieces of the frame (i.e. those portions of the frame that are hinged to the temples), and also in register with the connection between the eyebrow portion (portion above the lens) and the bridge (the portion linking the arcuate portions or linking the two lenses, and designed to rest on the nose of the wearer of the eyeglasses); three orifices are pierced (e.g. using a hand-held drill) through the periphery of the screen while maintaining a bridge of screen material between the orifice and the outline of the screen; and d) the engagement portion provided on an end portion of the hook is inserted into each of the orifices by deforming an abutment and by exerting traction on said end portion of the hook; after which excess end portion that has passed through the orifice is cut off, leaving only a residual portion projecting from the orifice.

As an alternative to above operations a) and b), if a template is available having the same size as the lens and of a shape appropriate for the frame of the eyeglasses under consideration, then the screen can be cut to size using the template instead.

When performing above operations c) and d), it is possible to use an adhesive for temporarily securing the lens of the screen (once it has been cut to size) to the lens of the eyeglasses, and/or to the frame of the eyeglasses or to the pair of eyeglasses.

Prior to operation d), and where appropriate, a hook blank is selected from a plurality of available blanks as a function in particular of the thickness of the lens of the eyeglasses and/or of the thickness of the frame thereof, after which a hook is formed from the hook blank by optionally cutting off end portions of the blank (and of the hook), likewise for the purpose of matching the hook to the pair of eyeglasses.

The lenses used for making monocular screens of the invention are made of a silica-based material, or of an organic material (CR 39), or indeed of a polycarbonate type plastics material. Radii of curvature 330 and 410 are at least equal to the thickness 100, 101 of the hook body, and are preferably of the order of twice of this thickness.

I claim:

1. A deformable hook for removably securing a monocular screen to an eyeglass, the hook comprising:
   a first end portion for fixing to said screen;
   a second end portion for contacting with a peripheral surface of said eyeglass; and
   a central portion interconnecting said first and second end portions and for passing over an edge surface of said eyeglass, said hook being a single molding of plastics material, said second end portion having two successive bends of opposite curvature, and said first and second end portions and said central portion being of an elongate shape.

2. A hook according to claim 1, wherein said plastics material is a polyurethane.

3. A hook according to claim 1, wherein said hook is of a resilient material, said first and second end portions are positionable against opposing peripheral surfaces of said eyeglass to retain said screen relative to said eyeglass, and said first and second end portions and said central portion cooperate to resiliently pinch said eyeglass.

4. A hook according to claim 1, wherein said second end portion is of an S shape.

5. A hook according to claim 1, wherein said central portion is of an elongate shape and of a cross section having an area in a range of 0.5 mm$^2$ to 5 mm$^2$.

6. A hook according to claim 1, wherein said first end portion is of a rectilinear shape along a longitudinal axis.

7. A hook according to claim 1, wherein said first end portion comprises:
   an end portion with a shape which is one of conical, frustoconical and tapering;
   an intermediate portion extending from said end portion, said intermediate portion being extendable through an orifice in a periphery of said eyeglass;
   a stop portion extending from said intermediate portion and comprising at least one projecting stop forming a first abutment which is one of deformable and retractable;
   a pin portion extending from said stop portion and extendable through an orifice in a periphery of said eyeglass, said intermediate portion being aligned with respect to said pin portion; and
   a link portion between said pin portion and said central portion and comprising at least one stop forming a second abutment.

8. A hook according to claim 7, wherein said pin portion has a length in a range of 1 mm to 2 mm, and said first end portion has a length in a range of 5 to 15 mm.

9. A hook according to claim 7, wherein said link portion, central portion and said second end cooperate to resiliently pinch o posing peripheral surfaces of said eyeglass.

10. A hook according to claim 7, wherein said first end portion comprises said first abutment which is retractable through an orifice in a periphery of said screen, and at least one said second abutment, said first and second abutments being disposed on either side of said pin portion extendable through an orifice in a periphery of said screen.

11. A deformable hook for removably securing a monocular screen to an eyeglass, the hook comprising:

a first end portion for fixing to said screen;

a second end portion for contacting with a peripheral surface of said eyeglass; and a central portion interconnecting said first and second end portions and for passing over an edge surface of said eyeglass, said first end portion comprising a pin portion extendable through an orifice in a periphery of said screen, said hook being a solid body, said first end portion being of a rectilinear shape extending along a longitudinal axis, said first end portion comprising:

an end portion with a shape which is one of conical, frustoconical and tapering;

an intermediate portion extending from said end portion and aligned with respect to said pin portion, said intermediate portion being extendable through an orifice in a periphery of said eyeglass;

a stop portion extending from said intermediate portion and comprising at least one projecting stop forming a first abutment which is one of deformable and retractable; and a link portion between said pin portion and said central portion and comprising at least one stop forming a second abutment.

12. A hook according to claim 11, wherein said hook is of a plastics material.

13. A hook according to claim 12, wherein said plastics material is polyurethane.

14. A hook according to claim 11, wherein said pin portion is of a length in a range of 1 mm to 2 mm, and said first end portion is of a length in a range of 5 mm to 15 mm.

15. A hook according to claim 11, wherein said intermediate portion is of a cylindrical shape.

16. A hook according to claim 11, wherein said hook is of a resilient material, said first and second end portions are positionable against opposing peripheral surfaces of said eyeglass to retain said screen relative to said eyeglass, and said first and second end portions and said central portion cooperate to resiliently pinch said eyeglass.

17. A monocular screen for an eyeglass, said screen comprising a lens and a plurality of hooks, each of said hooks comprising:

a first end portion for fixing to said screen;

a second end portion for contacting with a peripheral surface of said eyeglass; and a central portion interconnecting said first and second end portions and for passing over an edge surface of said eyeglass, said hook being a single molding of plastics material, said second end portion having two successive bends of opposite curvature, and said first and second end portions and said central portion being of an elongate shape;

said lens having a plurality of orifices through which a pin portion of one end of a respective one of said hooks is extended, said pin portion having an end with a projecting stop portion outside said lens and forming an abutment.

18. A screen according to claim 17, wherein said plurality of hooks and orifices is three hooks and respective orifices, said hooks being of a plastics material, an unstressed length of said pin portion of said hook in said orifice of said lens being shorter than a thickness of the lens, and a largest transverse dimension of said pin portion being greater, when unstressed, than a diameter of said orifice.

* * * * *